(12) United States Patent
Katoh et al.

(10) Patent No.: US 6,210,763 B1
(45) Date of Patent: Apr. 3, 2001

(54) DOUBLE-GLAZING UNIT

(75) Inventors: Hidemi Katoh, Itami; Naoto Horiguchi, Muko; Masao Misonou, Nishinomiya, all of (JP)

(73) Assignee: Nippon Sheet Glass Co., LTD, Osaka (JP)

( * ) Notice: Subject to any disclaimer, the term of this patent is extended or adjusted under 35 U.S.C. 154(b) by 0 days.

(21) Appl. No.: 09/297,815

(22) PCT Filed: Aug. 31, 1998

(86) PCT No.: PCT/JP98/03906

§ 371 Date: May 4, 1999

§ 102(e) Date: May 4, 1999

(87) PCT Pub. No.: WO99/11580

PCT Pub. Date: Mar. 11, 1999

(30) Foreign Application Priority Data

Sep. 4, 1997 (JP) .................................... 9-239352

(51) Int. Cl.[7] .................................... E06B 3/24; E04C 2/54
(52) U.S. Cl. ............................. 428/34; 52/786.13
(58) Field of Search ........................... 428/34, 192, 120, 428/213; 52/786.1, 786.13

(56) References Cited

U.S. PATENT DOCUMENTS 5,270,084  * 12/1993  Parker ................................. 428/34

FOREIGN PATENT DOCUMENTS

| 1290624 | 10/1991 | (CA) . |
| 0421239 | 4/1991 | (EP) . |
| WO 93/15296 | * 8/1993 | (WO) . |
| 9612862 | 5/1996 | (WO) . |

* cited by examiner

*Primary Examiner*—Donald J. Loney
(74) *Attorney, Agent, or Firm*—Fulbright & Jaworski, LLP

(57) ABSTRACT

In a double glazing including a pair of glass sheets 1, a plurality of spacers 2 disposed between opposed sheet faces of the glass sheets 1 by a predetermined pitch, and a sealing member 4 interposed between the glass sheets 1 along the entire peripheries thereof, with a space V between the glass sheets being sealed in a vacuum condition, each spacer 2 is formed so as to maintain a predetermined distance between the glass sheets when subjected to a static normal external pressure normally applied thereto in the direction of sheet thickness and also to relieve stress through plastic deformation when subjected to an impact dynamically applied in the sheet thickness direction.

4 Claims, 2 Drawing Sheets

DOUBLE-GLAZING UNIT

TECHNICAL FIELD

The present invention relates to a double glazing including a pair of glass sheets, a plurality of spacers disposed between opposed sheet faces of the glass sheets by a predetermined pitch, and a sealing member interposed between the glass sheets along the entire peripheries thereof, with a space between the glass sheets being sealed in a vacuum condition.

BACKGROUND ART

As a glass sheet structure providing a higher heat-insulating performance than a single glass sheet, there is known a double glazing comprising a pair of glass sheets assembled together with an air layer interposed therebetween as a heat-insulating layer. This type of double glazing, however, has the problem that the significant thickness of the glazing tends to impair the aesthetic appearance including that of the sash. Then, as a double glazing having smaller thickness yet providing superior heat-insulating performance, there has been proposed a double glazing in which a plurality of spacers (cylindrical spacers formed small so as not to impair the aesthetic appearance) are distributed between the pair of glass sheets and a sealing member made of e.g. low melting-point glass is provided between and along the entire peripheral edges of the glass sheets so as to keep the space under an evacuated condition.

By providing the respective spacers and the sealing member, a predetermined distance between the two glass sheets may be maintained although the space is evacuated. With this type of conventional double glazing, however, the spacer is formed of material (e.g. stainless steel, nickel, molybdenum, tungsten, tantalum, titanium, ceramics) having a high strength and low tendency of plastic deformation so as to be able to maintain the predetermined distance between the glass sheets against not only a normal static external pressure normally applied in the direction of sheet thickness but also against an impact dynamically applied in the sheet thickness direction.

With the conventional double glazing described above, it is possible indeed to constantly maintain the distance between the glass sheets at a predetermined value due to the high strength and low elastic deformability of the spacer per se. However, since the spacer per se has a high strength and low tendency of plastic deformation, when the double glazing is subjected to an impact, it is difficult to relieve the impact applied in a concentrated manner at the point of contact between the spacer and the glass sheet, so that the glass sheet tends to be broken.

Accordingly, the object of the present invention is to provide a double glazing which can overcome the above-described problem and which cannot be readily broken by a dynamically applied external force.

DISCLOSURE OF THE INVENTION

According to the characterizing features of the present invention relating to claim 1, as illustrated in FIGS. 1, 2, in a double glazing including a pair of glass sheets, a plurality of spacers disposed between opposed sheet faces of the glass sheets by a predetermined pitch, and a sealing member interposed between the glass sheets along the entire peripheries thereof, with a space between the glass sheets being sealed in a vacuum condition, each spacer is formed so as to maintain a predetermined distance between the glass sheets when subjected to a static normal external pressure normally applied thereto in the direction of sheet thickness and also to relieve stress through plastic deformation when subjected to an impact dynamically applied in the sheet thickness direction.

With the characterizing features of the present invention relating to claim 1, the spacer is capable of maintaining the predetermined distance between the glass sheets when subjected to a static normal external pressure normally applied thereto in the sheet thickness direction and the spacer is also capable of relieving stress through plastic deformation thereof when subjected to an impact dynamically applied in the sheet thickness direction. Accordingly, it becomes possible to maintain the predetermined distance between the glass sheets against the effect of normal external pressure. And, at the same time, when the impact applies, there occurs plastic deformation in the spacers due to the effect of the external force, so that it is possible to receive the impact in a relieved state. As the result, it becomes possible to relieve a strong impact which would be applied in a concentrated manner at the point of contact between the glass sheets and the spacers in the case of the conventional art. Hence, with this double glazing, its glass sheets can hardly be broken.

Further, such effect as above may be achieved not only when the sealing member has plastic deformation capability like that of the spacer, but also when the member is formed of such material as low melting point glass that can hardly be plastically deformed.

That is to say, when the sealing member is formed of material having low tendency of plastic deformation, the amount of deformation in the direction of compression occurring due to the effect of the impact will be greater in each spacer than in the sealing member. And, in association with the difference between the deformation amounts, a tensile stress tends to be applied especially to the outer edge (in the vicinity of its portion bonded with the sealing member) of the glass sheet. However, as long as this tensile stress is within the tensile-stress strength of the glass sheets, the spacers may provide their relieving effect on the impact.

Further, according to the characterizing feature of the present invention relating to claim 2, the spacers have a diameter ranging between 0.30 and 1.00 mm, a disposing pitch of 10 to 25 mm and a normal-temperature strength of 4.5 to 9.5 kg/mm$^2$ in the above-described numerical ranges. With these features, the spacers may be less conspicuous. Hence, the function/effect of the invention relating to claim 1 may be achieved without significantly impairing the aesthetic appearance.

Here, the pressure applied to the spacer may be given by the following expression (1), provided the spacer has a diameter Do and a disposing pitch of L.

$$P = L^2 \times Po / \pi (Do/2)^2 \qquad (1)$$

where Po is a pressure applied from the outside of the double glazing.

Namely, regarding the spacer diameter, if its value is too small, the supporting force by the spacer will tend to act as a concentrated load on a limited portion of the glass sheet, whereby the possibility of local breakage of the glass sheets will increase. On the other hand, if its value is too large, the spacer will become conspicuous thereby to impair the aesthetic appearance. Especially, when transparent glass sheets are employed, the transparency will tend to be reduced. In addition, when the value is large, the thermal transmittance will increase, thereby to invite another problem of reduction in the heat insulating effect. Therefore, within the range capable of achieving the function/effect of the invention of claim 1, the diameter range of the spacer is set as 0.30 to 1.00 mm as a range in which the above-described respective problems are less likely to occur.

Further, regarding the disposing pitch of the spacers, this is closely related to the diameter size and the normal-temperature strength of the spacer, within the range capable of achieving the function/effect of the invention of claim 1, this disposing pitch of the spacers is set at 10 to 25 mm as a range in which the spacers may be formed less conspicuous thus avoiding deterioration of the aesthetic appearance and in which the predetermined space between the opposed glass sheets may be maintained even if distortion may be developed in the glass sheets due to the effect of external force. If this spacer disposing pitch exceeds 25 mm, the load due to the normal external force applied to each spacer will increase, whereby the spacer will be deformed by an amount that cannot be neglected substantially, so that it will lose its function as a spacer. In addition, this will result in increase in the tensile stress developed in the outer surface of the glass sheet immediately above the spacer, thus tending to invite breakage of the glass sheet. On the other hand, if the disposing pitch of the spacers is smaller than 10 mm, this will result in increase in the heat transmittance, thus inviting the risk of reduction in the heat insulating performance.

Further, regarding the normal-temperature strength of the spacer (this is the value of stress that provides a permanent strain rate, the greater the value, the greater the tendency of plastic deformation), this is set within a range capable of achieving the function/effect of the invention of claim 1 in the above ranges of the diameter and disposing pitch of the spacer.

Also, regarding the height of the spacer, within the range capable of achieving the function/effect of the invention of claim 1, this height dimension of the spacer is set at 0.1 to 0.5 mm as a range capable of forming the predetermined space between the opposed glass sheets.

As the spacer is provided with the above-described respective values, the double glazing can be hardly breakable since it can receive the impact in a relieved state and it can relieve the locally concentrated strong impact occurring at the point of contact between the respective spacers and the glass sheets in the case of the conventional art.

Further, according to the characterizing feature of the present invention relating to claim 3, the heat transmittance between the pair of glass sheets is lower than 3.3 Kcal/m$^2$hr° C. With this setting of the heat transmittance between the pair of glass sheets below 3.3Kcal/m$^2$hr° C., the heat-insulating performance of the double glazing may be further enhanced.

Further, according to the characterizing feature of the present invention relating to claim 4, at least one of the pair of glass sheets has a thickness dimension ranging 2.7 to 3.3 mm, while the other glass sheet 1 has a thickness dimension same as or greater than that of the one glass sheet 1.

With the characterizing feature of the invention of claim 4, the functions/effects of the inventions of claims 1–3 may be achieved. In addition, as at least one of the pair of glass sheets has a thickness dimension ranging 2.7 to 3.3 mm, while the other glass sheet has a thickness dimension same as or greater than that of the one glass sheet. Hence, although the one sheet glass a small thickness, the pair of glass sheets as a whole may receive an external force while being capable of relieving the impact through the spacers. As the result, the entire double glazing may be formed thin and at the same time may provide the heat insulating and impact buffering effects. Hence, the double glazing can effectively endure severe environmental conditions and may be functionally superior.

Moreover, by setting the thickness dimension of the other glass sheet greater than that of the one glass sheet, it becomes possible to further improve the strength of the entire double glazing.

BEST MODE OF EMBODYING THE INVENTION

The present invention will be described in greater details with reference to the accompanying drawings.

Figure 1:
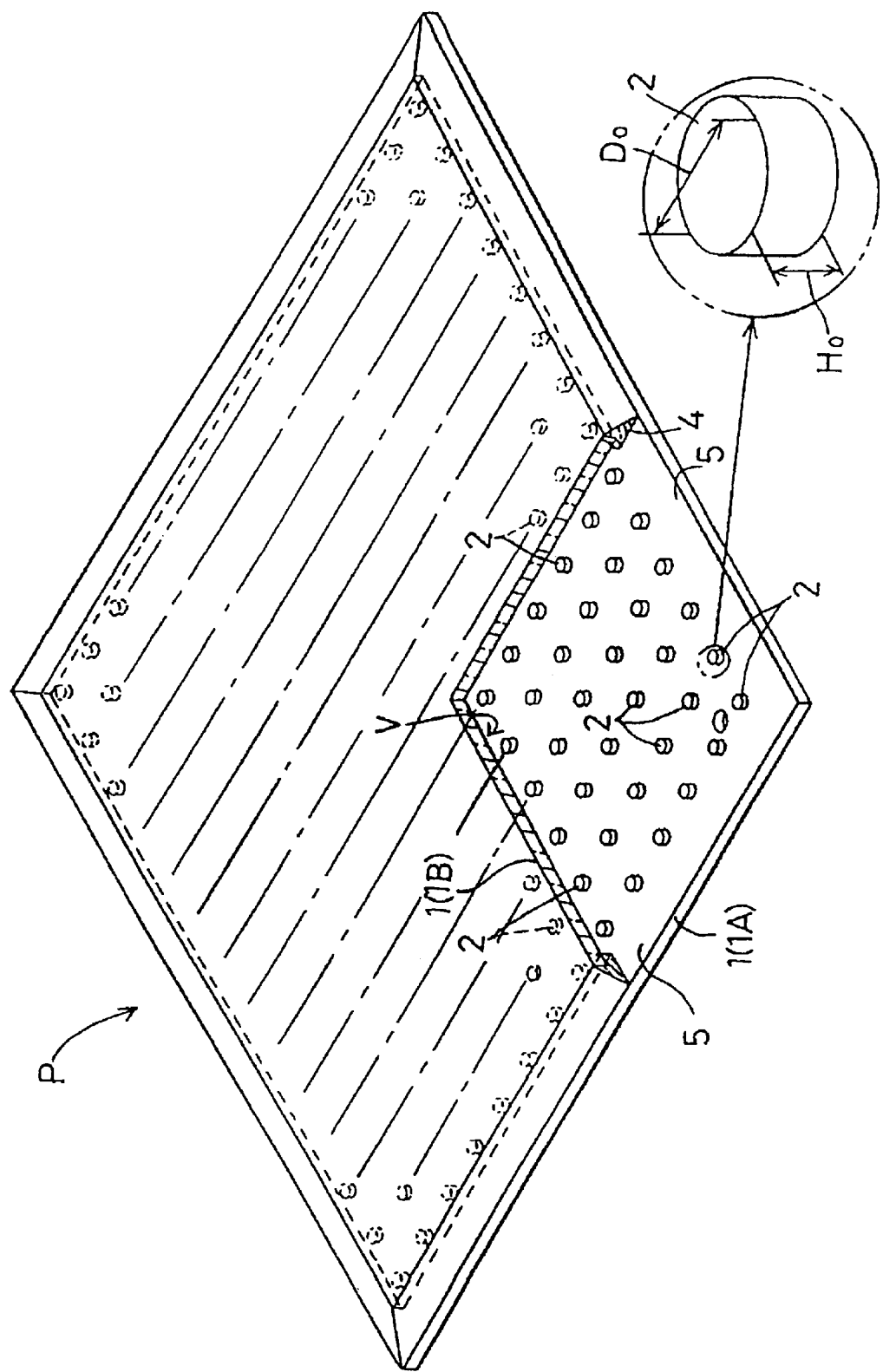
FIG. 1 is a partially cutaway perspective view showing a double glazing.
Figure 2:
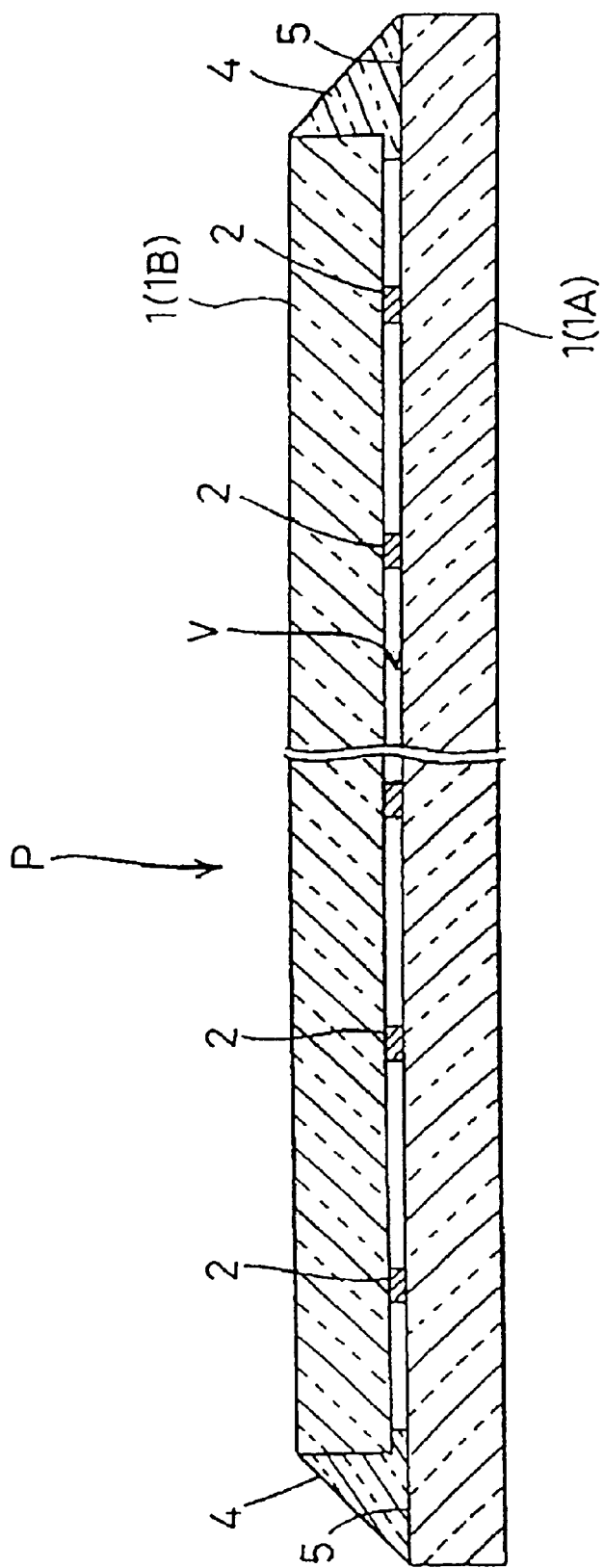
FIG. 2 is a section view of the double glazing.

FIGS. 1 and 2 show a double glazing according to one embodiment of the present invention, in which the double glazing P includes a pair of glass sheets 1, and a plurality of spacers 2 interposed between the glass sheets 1 and spaced apart from each other along the sheet faces, with a space V between the opposed glass sheets 1A, 1B being sealed in a vacuum condition.

Each of the pair of glass sheets 1 is a transparent float glass sheet having a thickness dimension of 3 mm (so-called 3 mm glass sheet according to JIS, and having an actual thickness dimension of 2.7 to 3.3 mm including possible thickness tolerance thereof. Along the entire outer peripheral edges of the two glass sheets, a sealing portion (an example of a sealing member) 4 made of a low melting point glass (e.g. solder glass) is provided for sealing the space V. And, the space V is constructed in a vacuum condition ($1\times10^{-3}$ Torr or lower) by such method as manufacturing the double glazing under a vacuum environment or suction of air from the double glazing after manufacturing thereof.

Incidentally, the outer peripheral portions of the opposed glass sheets 1 are disposed in such a manner that one glass sheet 1A projects relative to the other along the direction of sheet face so as to form a projecting portion 5. Then, when the sealing portion 4 is formed by placing sealing material on this projecting portion 5, the outer peripheral portion of the space V may be sealed in an efficient and reliable manner.

Preferably, the spacer 2 is formed of material having a normal-temperature strength (this is the value of stress that provides a permanent stress rate, the greater the value, the greater the tendency of plastic deformation) of 4.5 to 9.5 Kg/mm$^2$. And, in the instant embodiment, each spacer is made of an aluminum alloy. If the strength is too small, significant plastic deformation will develop in the spacer 2 due to the atmospheric pressure applied to the glass sheets 1, so that the space V may not be maintained, thus leading to deterioration in the heat insulating performance or breakage of the glass sheets 1. On the other hand, if the strength is too great, there will occur little deformation due to the effect of impact dynamically applied in the direction of sheet thickness, so that it becomes difficult to relieve the impact and the impact may be applied in a concentrated manner to the contact point between the spacer 2 and the glass sheet 1, thus breaking the glass sheet 1.

Further, the spacer is formed in a cylindrical shape and has a diameter of 0.30 to 1.00 mm and a height of 0.1 to 0.5 mm. Then, as the portion of the spacer contacting the glass sheets is formed circular, it is possible to avoid, in the portion contacting the glass sheets, formation of any angular portion which tends to invite stress concentration, thereby to reduce the possibility of breakage of the glass sheets 1.

On the other hand, the disposing pitch of the spacers 2 is set at 10 to 25 mm.

Incidentally, referring to an example of the method of producing the spacer 2, a thin plate (0.1 to 0.5 mm in thickness) of an aluminum alloy as the raw material is prepared. Then, by machining this thin sheet by means of e.g. punching, the cylindrical spacer having the predetermined diameter (0.30 to 1.00 mm) may be formed.

Further, referring to an example of the method of making the double glazing P, first, one glass sheet 1A defining a through hole for use in evacuation and the other sheet glass 1B having no such through hole are cleaned in advance. Then, onto the glass sheet 1B, the respective spacers 2 are disposed by a predetermined pitch (10 to 25 mm); and the glass sheet 1A will be placed over the glass sheet 1B via the spacers 2. Thereafter, the low melting point glass is applied to the entire outer peripheral edges of the pair of glass sheets and maintained under a temperature of 400 to 500 degrees for one hour approximately so as to seal the outer peripheries. Then, by raising the temperature to 120 degrees while evacuating through the through hole so as to promote discharge of gas from the surfaces of the opposed glass sheets. Then, after sufficient discharge of gas, the through hole is sealed. With this, the double glazing P is formed.

By constructing the double glazing with the above-described set values, it becomes possible to maintain the predetermined distance between the glass sheets against the effect of the static atmospheric pressure (corresponding to the normal external pressure) normally applied to the glazing in the direction of sheet thickness thereof and also to relieve the stress or dynamically applied impact through plastic deformation of the spacers, thus avoiding breakage of the glass sheets.

Next, there will be described experiments which were conducted for checking the above-described effect of static external force and adaptability for the effect of dynamically applied external force on the double glazing.

The double glazing used in the experiments had the following conditions.

The glass sheet comprised a 3 mm float glass sheet having dimensions of 300×300 mm.

The spacer was a cylindrical spacer made of an aluminum alloy and having a diameter of 0.5 mm and a height of 0.2 mm. In some experiments, a spacer made of SUS304 and having the identical dimensions was employed as a comparison example.

First, in order to check the appropriate value for the spacer disposing pitch, in a double glazing, the spacer disposing pitch was varied step-by-step from 5 to 35 mm with 5 mm increment. The spacers employed were aluminum alloy spacers having a normal-temperature strength of 5.6 Kg/mm². On each of these, a measurement of heat transmittance (according to the heat transmittance testing method for a double glazing provided by JIS R3106) and a measurement of change in the spacer height after lapse of 7 days were conducted.

The results of the measurements of heat transmittance are shown in Table 1. The results of the measurements of change in spacer height are shown in Table 2.

Incidentally, the changes in the spacer height were calculated by the following expression (2) based on the change in the value of diameter, on the assumption that no change occurred in the volume before and after the deformation.

from $((Do+d)/Do)^2 = Ho/(Ho-h)$, $$h = Ho(1-(Do/(Do+d))^2) \qquad (2)$$

Do: diameter of the spacer
d: change in the diameter
Ho: height of the spacer
h: change in the height As may be apparent from Table 1, when the spacer disposing pitch is below 10 mm, the heat transmittance exceeds 3.5 Kcal/m²hr° C., which is significantly inferior to the value of 2.9 Kcal/m²hr° C. provided by a commonly used air-layered 6 mm thickness double glazing. This is undesirable.

TABLE 1

| spacer disposing pitch (mm) | heat transmittance (Kcal/m² hr ° C.) |
| --- | --- |
| 5 | 3.8 |
| 10 | 3.3 |
| 15 | 2.7 |
| 20 | 2.3 |
| 25 | 2.2 |
| 30 | 2.1 |
| 35 | 2.1 |

TABLE 2

| spacer disposing pitch (mm) | change in spacer diameter (%) | change in spacer height (μm) |
| --- | --- | --- |
| 5 | 0 | within tolerance |
| 10 | 2 | 8 |
| 15 | 3 | 12 |
| 20 | 6 | 22 |
| 25 | 9 | 31 |
| 30 | 17 | 55 |
| 35 | 39 | 97 |

As for the glass sheet to which the present experiments relate, when the change in spacer height exceeds 40 μm, the glass sheet will be broken spontaneously due to a tensile stress acting on its portion (outer edge surface) fixed by he low melting point glass. Hence, it is preferred that the change in spacer height be below 40 μm. As the spacer disposing pitch that satisfies this condition, it is preferred, as judged from Table 2, that the pitch be 25 mm or less.

Accordingly, as judged from Tables 1 and 2, it is preferred that the spacer disposing pitch range between 10 mm and 25 mm. With this, the double glazing will hardly be broken under the natural condition while having desirable heat insulating performance.

Next, in order to find out an appropriate value for the normal-temperature strength of the spacer, following experiments were conducted on a double glazing in which aluminum alloy spacers differing in the normal-temperature strength from 2.9, 4.1, 5.6, 7.1, 9.2, 11.7 to 15.5 kg/mm² were disposed by the disposing pitch of 20 mm, and a further double glazing, as a comparison example, in which spacers made of SUS304 (having a normal temperature strength of 21.0 kg/mm²) were disposed by the same disposing pitch.

First, a measurement of change in the spacer diameter after lapse of seven days like the foregoing experiments and a measurement of change in spacer height which occurred after 1000 times of application of load (maximum 150 kg/cm², stress velocity 100 kg/m² per sec.) thereto from suction discs (50 mm in diameter) attached to the front and rear sides of the double glazing (to be referred to hereinafter as height change after vibration) were conducted to find out the lower limit of the normal-temperature strength of the spacer satisfying the condition of 40 μm or less which is the limit value of the change in spacer height.

The results of the measurement of the spacer height change after lapse of 7 days are shown in Table 3, and the results of measurement of the change in height after the vibration are shown in Table 4.

Further, in accordance with the testing standard for safety glass (laminated glass JIS R3205, tempered glass JIS R3206), further experiments were conducted. In these, a 1.04 kg steel ball was dropped repeatedly onto the double glazing from the height of 10 cm. Then, the number of falls until the double glazing was broken was measured. Also, by varying the dropping height of the same steel ball, the dropping height when the double glazing was broken was measured. In these manners, an upper limit value preferable as the normal-temperature strength was studied.

The results of the measurement of the number of falls are as shown in Table 5, and the results of the measurement of the dropping height are as shown in Table 6 below.

TABLE 3

| normal temperature strength (Kg/mm$^2$) | change in spacer diameter (%) | change in spacer height (μm) | materials employed (aluminum alloy ID numbers according to JISH4000) |
|---|---|---|---|
| 2.9 | 23 | 68 | A1050 |
| 4.1 | 19 | 59 | A3003 |
| 5.6 | 6 | 22 | A3105 |
| 7.1 | 4 | 15 | A3004 |
| 9.2 | 3 | 11 | A5052 |
| 11.7 | 2 | 7 | A5154 |
| 15.5 | 1 | 4 | A5182 |
| 21.0 | 0 | within tolerance | SUS304 |

TABLE 4

| normal temperature strength (Kg/mm$^2$) | change in spacer diameter (%) | change in spacer height (μm) | materials employed (aluminum alloy ID numbers according to JISH4000) |
|---|---|---|---|
| 2.9 | — | broken | A1050 |
| 4.1 | 32 | 81 | A3300 |
| 5.6 | 9 | 33 | A3105 |
| 7.1 | 7 | 25 | A3004 |
| 9.2 | 4 | 15 | A5052 |
| 11.7 | 2 | 7 | A5154 |
| 15.5 | 1 | 5 | A5182 |
| 21.0 | 0 | within tolerance | SUS304 |

TABLE 5

| normal temperature strength (Kg/mm$^2$) | number of repetition of impact (times) | materials employed (aluminum alloy ID numbers according to JISH4000) |
|---|---|---|
| 2.9 | 50 | A1050 |
| 4.1 | 13 | A3300 |
| 5.6 | 20 | A3105 |
| 7.1 | 10 | A3004 |
| 9.2 | 8 | A5052 |
| 11.7 | 4 | A5154 |
| 15.5 | 0 (broken in the first time) | A5182 |
| 21.0 | 0 (broken in the first time) | SUS304 |

TABLE 6

| normal-temperature strength (Kg/mm$^2$) | dropping height of breakage (cm) | | | materials employed (aluminum alloy ID numbers according to JISH4000) |
| | min. value | max. value | ave. value | |
|---|---|---|---|---|
| 2.9 | 23 | 36 | 29.4 | A1050 |
| 4.1 | 23 | 36 | 27.3 | A3300 |
| 5.6 | 29 | 44 | 31.9 | A3105 |
| 7.1 | 23 | 29 | 25.1 | A3004 |
| 9.2 | 13 | 23 | 19.7 | A5052 |
| 11.7 | 16 | 10 | 12.0 | A5154 |
| 15.5 | 9 | 9 | 9.0 | A5182 |
| 21.0 | 9 | 3 | 5.4 | SUS304 |

From Tables 3 and 4, it may be said that the normal-temperature strength of the spacer satisfying the condition of 40 μm or less which is the limit value of the change in spacer height should preferably be 4.5 Kg/mm$^2$ or more.

Further, from Tables 5 and 6, with the assumption of the conditions of the times of dropping until the breakage being about 10 times and the dropping height resulting in the breakage being about 20 cm, the normal temperature strength of the spacer satisfying these conditions should preferably be 9.5 Kg/mm$^2$ or less.

Accordingly, based on Tables 3 through 6, the normal-temperature strength of the spacer should preferably range between 4.5 Kg/mm$^2$ and 9.5 Kg/mm$^2$. With this, the double glazing may provide the impact relieving effect on the effect of dynamic external force and the glazing may hardly be broken when subjected to e.g. a significant wind pressure.

Next, other embodiments will be described.

(1) The spacer is not limited to the aluminum alloy spacer described in the foregoing embodiment. Instead, it may be made of e.g. aluminum, gold, lead, indium, tin, silver, copper or alloy including any of these as the major component thereof. In short, it is preferred that the spacer be made of any material having the normal-temperature strength in the range of 4.5 Kg/mm$^2$ to 9.5 Kg/mm$^2$.

(2) The sealing member is not limited to the one using low melting point glass described in the foregoing embodiment. Instead, it may be formed of material having a substantially same degree of deformability as the spacer. In this case, it becomes possible to relieve the stress through more uniform deformation against the effect of impact dynamically applied in the sheet thickness direction, so that the double glazing may be hardly breakable by the impact.

Some specific kinds of such material include organic adhesive, low melting point metal, flexible metal and so on.

Further, in this case, it is also possible to employ, in combination, another sealing member for assuring the sealing between the sealing member and the glass sheets.

(3) The glass sheet is not limited to the 3 mm thickness glass sheet described in the foregoing embodiment, but may be a glass sheet having a different thickness. Further, the type of glass may be arbitrarily selected. For instance, the glass sheet may be e.g. figured glass, frosted glass (glass provided with light diffusing function by means of surface treatment), wire glass, tempered glass, or glass sheet provided with such functions as heat absorption, ultraviolet absorption, heat reflection etc.

Further, when the thickness dimension of one of the pair of glass sheets is set in the range of 2.7 to 3.3 mm, the thickness dimension of the other glass sheet may be set to a range greater than that of the one glass sheet.

INDUSTRIAL FIELD OF APPLICATION

As described above, the double glazing relating to the present invention is useful as a double glazing which can hardly be broken due to a dynamically applied external force. In particular, this is suitable as a double glazing which can relieve locally concentrated strong impact occurring at the point of contact between the spacer and the glass sheet when a strong impact is applied thereto.

What is claimed is:

1. A double-glazing comprising a pair of glass sheets;

a plurality of spacers disposed between opposed sheet faces of the glass sheets by a predetermined pitch; and a sealing member interposed between the glass sheets along the entire peripheries thereof, with a space between the glass sheets being sealed in a vacuum condition;

wherein each said spacer maintains a predetermined distance between the glass sheets when subjected to a static normal external pressure normally applied thereto in the direction of sheet thickness and relieves stress through elastic deformation thereof when subjected to an impact dynamically applied in the sheet thickness direction in a locally concentrated manner to the glass sheets;

said spacers having a diameter ranging between 0.30 and 1.00 mm, a disposing pitch of 10 to 25 mm and a normal-temperature strength of 4.5 to 9.5 kg/mm$^2$.

2. The double glazing according to claim 1, wherein the heat transmittance between the pair of glass sheets is lower than 3.3 Kcal/m$^2$hr° C.

3. The double glazing according to claim 1, wherein at least one of the pair of glass sheets has a thickness dimension ranging from 2.7 to 3.3 mm, while the other glass sheet has a thickness the same or greater than that of at least one glass sheet.

4. The double glazing according to claim 2, wherein at least one of the pair of glass sheets has a thickness dimension ranging from 2.7 to 3.3 mm, while the other glass sheet has a thickness the same as or greater than that of said at least one glass sheet.

* * * * *